US009307401B2

United States Patent
De Simone et al.

(10) Patent No.: US 9,307,401 B2
(45) Date of Patent: Apr. 5, 2016

(54) METHOD TO DETECT CALLS ON AN AMR-WB CAPABLE NETWORK

(75) Inventors: Giuseppe De Simone, Tungelsta (IT); Rita Di Donato, Cava de' Tirreni (IT); Cristiano Rabboni, San Giorgio a Cremano (IT)

(73) Assignee: TELEFONAKTIEBOLAGET L M ERICSSON, Stockholm (SE)

( * ) Notice: Subject to any disclaimer, the term of this patent is extended or adjusted under 35 U.S.C. 154(b) by 820 days.

(21) Appl. No.: 13/575,047

(22) PCT Filed: Jan. 29, 2010

(86) PCT No.: PCT/EP2010/051065
§ 371 (c)(1),
(2), (4) Date: Jul. 25, 2012

(87) PCT Pub. No.: WO2011/091852
PCT Pub. Date: Aug. 4, 2011

(65) Prior Publication Data
US 2012/0295600 A1    Nov. 22, 2012

(51) Int. Cl.
*H04W 24/00* (2009.01)
*H04W 12/02* (2009.01)
*H04L 29/06* (2006.01)

(52) U.S. Cl.
CPC .............. *H04W 12/02* (2013.01); *H04L 63/30* (2013.01)

(58) Field of Classification Search
CPC ..................................................... H04W 24/00

USPC .................................. 455/414.1–436, 452.2
See application file for complete search history.

(56) References Cited

U.S. PATENT DOCUMENTS

| 8,611,951 | B2* | 12/2013 | So et al. ................... 455/552.1 |
| 2007/0297418 | A1* | 12/2007 | Lee ........................ H04L 63/00 370/395.52 |
| 2008/0198993 | A1* | 8/2008 | Imbimbo ............ H04L 12/2602 379/213.01 |
| 2008/0235186 | A1* | 9/2008 | Laurila ............. G06F 17/30864 |
| 2009/0006528 | A1* | 1/2009 | Batni et al. .................... 709/203 |
| 2009/0097420 | A1* | 4/2009 | Chiang ................ H04L 63/306 370/259 |

FOREIGN PATENT DOCUMENTS

EP    1307036 A1    5/2003

* cited by examiner

*Primary Examiner* — Michael T Vu
(74) *Attorney, Agent, or Firm* — Patents on Demand, P.A.; Brian K. Buchheit; Scott M. Garrett

(57) ABSTRACT

Embodiments of the present invention include methods and arrangements to detect an end-to-end call on a AMR-WB capable network involving at least one monitored identity. According to an embodiment of the invention, call events related to the at least one monitored identity through at least one intercepting control element in a telecommunication network is monitored. A start notification message by the at least one intercepting control element is delivered whenever an AMR-WB codec is chosen in the telecommunication network as a selected codec for an end-to-end call between the at least one monitored identity and another identity.

12 Claims, 3 Drawing Sheets

METHOD TO DETECT CALLS ON AN AMR-WB CAPABLE NETWORK

TECHNICAL FIELD

The present invention relates to methods and arrangements for detecting calls on an AMR-WB capable network.

BACKGROUND

Lawful Interception and Data Retention of communications is used to intercept speech calls made or received by persons suspected of criminal activities. In governments around the world, various law enforcement agencies may have the right to authorize this interception/retention in their respective jurisdictions.

FIG. 1 is part of the prior art and discloses an Intercept Mediation and Delivery Unit IMDU, also called Intercept Unit. The IMDU is a solution for monitoring of Interception Related Information IRI and Content of Communication CC for the same target. The different parts used for interception are disclosed in current Lawful Interception standards (see 3GPP TS 33.107 and 3GPP TS 33.108—Release 8). A Law Enforcement Monitoring Facility LEMF is connected to three Mediation Functions MF, MF2 and MF3 respectively for ADMF, DF2, DF3 i.e. an Administration Function ADMF and two Delivery Functions DF2 and DF3. The Administration Function and the Delivery Functions are each one connected to the LEMF via standardized handover interfaces HI1-HI3, and connected via interfaces X1-X3 to an Intercepting Control Element ICE in a telecommunication system. Together with the delivery functions, the ADMF is used to hide from ICEs that there might be multiple activations by different Law Enforcement Agencies. Messages REQ sent from LEMF to ADMF via HI1 and from the ADMF to the network via the X1_1 interface comprise identities of a target that is to be monitored. The HI1 interface is thus used to set the interception orders in the operator network. The Delivery Function DF2 receives Intercept Related Information IRI from the network via the X2 interface. DF2 is used to distribute the IRI to relevant Law Enforcement Agencies LEAs via the HI2 interface. The Delivery Function DF3 receives Content of Communication CC, i.e. speech and data, on X3 from the ICE. Requests are also sent from the ADMF to the Mediation Function MF2 in the DF2 on an interface X1_2 and to the Mediation Function MF3 in the DF3 on an interface X1_3. The requests sent on X1_3 are used for activation of Content of Communication, and to specify detailed handling options for intercepted CC. In Circuit Switching, DF3 is responsible for call control signaling and bearer transport for an intercepted product. Intercept Related Information IRI, received by DF2 is triggered by Events that in Circuit Switching domain are either call related or non-call related. In Packet Switching domain the events are session related or session unrelated. In Packet Switching domain the events are session related or session unrelated.

For the activation of Intercept Related Information IRI, the message sent from the ADMF to the DF contains the target identity, which can be one of the following: the IMSI, MSISDN or IMEI codes commonly associated to a mobile phone subscription. Moreover, the message sent from the ADMF to the DF contains the address for delivery of IRI (i.e. the LEMF address), which subset of information shall be delivered, a DF2 activation identity, which uniquely identifies the activation for DF2 and is used for further interrogation or deactivation, respectively. Furthermore, the message sent from the ADMF to the DF also contains the IA and the warrant reference number, if required by national option.

Intercept Related Information events are generated at various moments, particularly when a call is initiated or ended, or for all supplementary services during a call and also for information which is not associated to a call. That is, there are call-related IRI events and non call-related IRI events. In any case, whenever an IRI event occurs which is originated by or directed to a mobile subscriber, the Intercepting Control Element ICE in the network sends the relevant data to the DF2 for them to be delivered to the LEMF.

To assure correlation between the independently transmitted Content of Communication CC and Intercept Related Information IRI of an intercepted call, the following parameters are used: Lawful Interception Identifier LIID, Communication Identifier CID and CC Link Identifier CCLID. Law enforcement provides an alphanumeric string, the Case Identity to identify a particular surveillance. A case identity may be assigned to a Monitored Object through a command.

The present digital cellular systems support a huge number of codec types. As a result, in order to allocate transcoders for a call inside the network and to select appropriate codec type inside the User Equipments, signaling procedures are defined to convey the codec type selected for a call to all affected nodes. Codec negotiation capabilities are defined to enable the selection of a codec type supported in all the affected nodes, that is, to resolve codec mismatch. This codec negotiation maximizes the chances of operating in compressed mode end-to-end for mobile-to-mobile calls. To allow transport of information in a compressed way in transmission networks, these networks make use of the transport-independent call control protocol, which provides means for signaling codec information, negotiation and selection of codecs end-to-end. Different codec negotiation procedures are described in standard 3GPP TS 23.153 Release 8. These procedures occur at call setup or in case of modifications, that is modification of selected codec, modification of available codec list, and mid-call codec negotiation. In all cases, both the originating and terminating MSC Server (which comprises the Intercepting Control Element ICE) are aware of the selected codec for the concerned call.

The AMR-WB (Adaptive Multi-Rate WideBand) speech codec algorithm is standardized both in 3GPP and in ITU-T with nine different encoding bit rates, ranging from 6.60 kbps up to 23.85 kbps. For speech telephony services, five of these nine modes are allowed in 3GPP, that is 15.85, 14.25, 12.65, 8.85 and 6.60 kbps. The frequency span for the analogue speech signal for AMR-WB ranges from 100 Hz to 7000 Hz, thus providing excellent speech quality due to a wider speech bandwidth compared to narrowband speech codecs which in general are optimized for wireline quality of 300 to 3400 Hz. FIG. 2 schematically shows the difference in spectrum range between AMR narrowband and wideband codecs. In AMR-WB, the extended lower spectrum brings volume and quality, while the extended higher spectrum brings clarity and transparency to the speech signal.

In the existing systems for Lawful Interception and Data Retention, a Law Enforcement Monitoring Facility LEMF has no information about whether an intercepted speech call is an end-to-end call using an AMR-WB codec, where a wider baseband spectrum is used by the parties in the call. This is of particular importance because if the Call Content is delivered over HI3 interface to a simple ISDN DSS1 terminal, the extended wideband frequency range is completely missed at the LEMF site.

This could represent a problem because malicious information could be transported over the wideband spectrum in the main call that would be completely missed over the monitoring leg. For instance, a criminal could make use of Morse signalling by means of acoustic signals between 3400 Hz and 7000 Hz frequency, or apply a frequency modulation of the narrowband speech at around 5200 Hz. Should this occur, the LEMF would miss important pieces of communication in the intercepted call, thus jeopardizing the task of completely monitoring the information exchanged via the operator network by a person suspected of criminal activities.

The problem at hand is thus how to detect and extract information possibly transported over the wideband spectrum in a end-to-end call involving a target who is a subject of lawful interception and or data retention due to a judicial warrant.

SUMMARY

The above-mentioned problem and others are solved by the invention which detects an end-to-end call making use of an AMR-WB codec in an AMR-WB capable network, so that the LEMF is notified accordingly whenever such a call involves a target who is a subject of lawful interception and or data retention due to a judicial warrant.

In particular, the invention involves new functions which allow to establish when an AMR-WB codec is negotiated in an end-to-end call, either at the beginning of a call or during it.

Preferably, but not limitatively, the invention also involves functions which allow to establish when the AMR-WB codec is no more used, e.g. because the end-to-end call is terminated or because of a modification of codec during the call, for example because one of the two subscribers has moved or switched to a cell within a network which has no AMR-WB capabilities.

More in detail, events indicating the establishment or termination of an end-to-end AMR-WB speech path trigger information about end-to-end AMR-WB transparency sent from an ICE over X2 interface to DF2, and the same events trigger DF2 to deliver IRI-CONTINUE messages containing information about end-to-end AMR-WB transparency to the LEMF over HI2 interface. The method involves monitoring at least a subscriber's identity, and comprises the following steps:

Call events related to the at least one monitored identity are monitored through at least one intercepting control element in a telecommunication network.

A start notification message is delivered by the at least one intercepting control element whenever an AMR-WB codec is chosen in the telecommunication network as a selected codec for an end-to-end call between the at least one monitored identity and another identity.

Preferably, an end notification message is also delivered by the at least one intercepting control element whenever a codec other than an AMR-WB codec is chosen in the telecommunication network or when a call using an AMR-WB codec is terminated.

In one aspect of the invention a Lawful Interception embodiment is disclosed. The invention works within the framework of a Data Retention application.

An object of the invention is to enhance the Lawful Interception and Data Retention solution in case of AMR-WB capable networks, so that all information can be retrieved by processing or post-processing data collected from an end-to-end call where AMR-WB codec has been negotiated. This object and others are achieved by methods, arrangements, nodes, systems and articles of manufacture. The solution proposed applies with particular regards, although non-limitatively, to GSM or WCDMA layered networks for which AMR-WB codec is normally made commercially available.

The invention will now be described more in detail with the aid of preferred embodiments in connection with the enclosed drawings.

DETAILED DESCRIPTION

Figure 1:
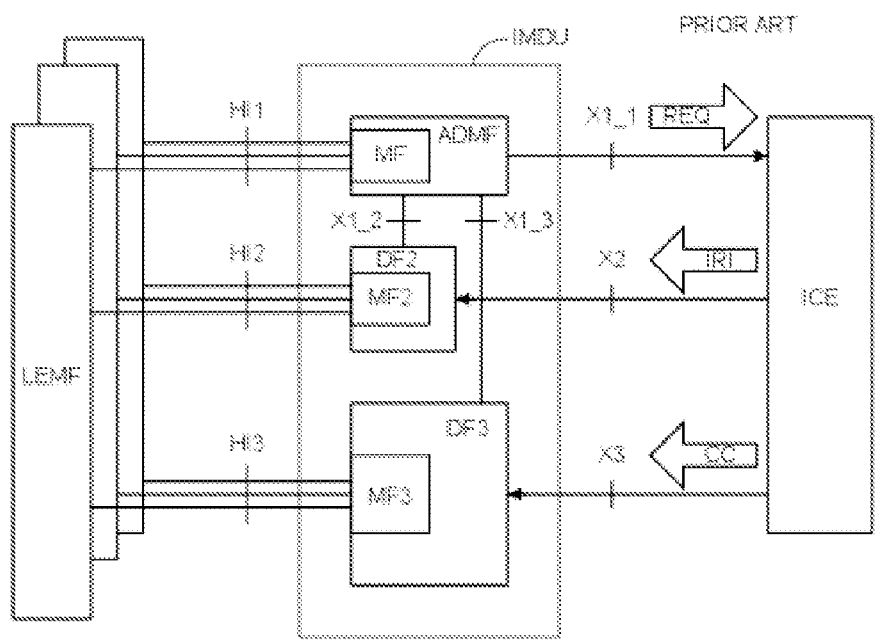
FIG. 1 is part of the prior art and discloses a block schematic illustration of an Intercept Mediation and Delivery Unit attached to an Intercepting Control Element.
Figure 2:
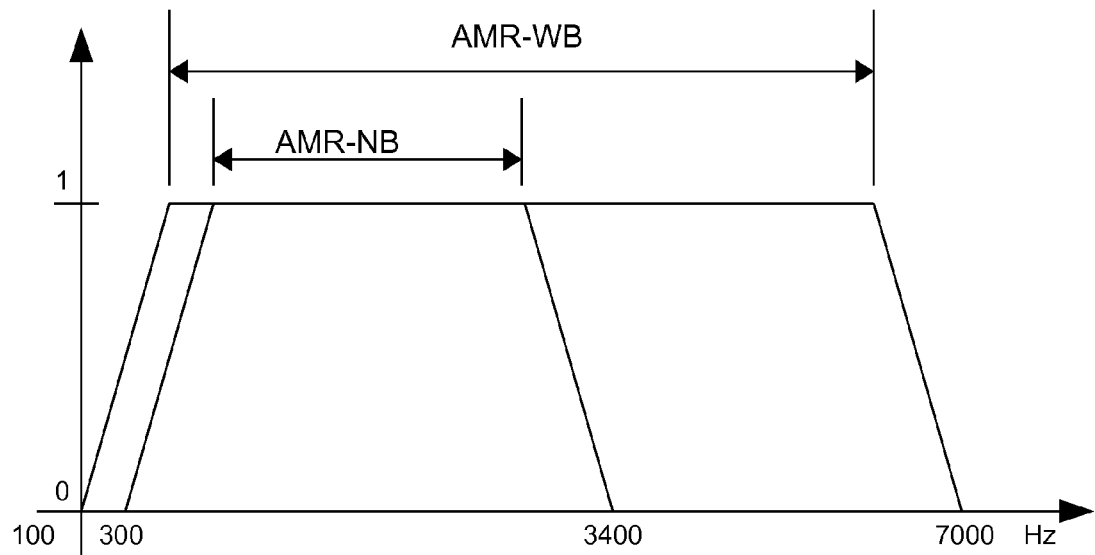
FIG. 2 is a schematic diagram which shows the relationship between AMR narrowband and wideband spectrum frequencies.
Figure 3:
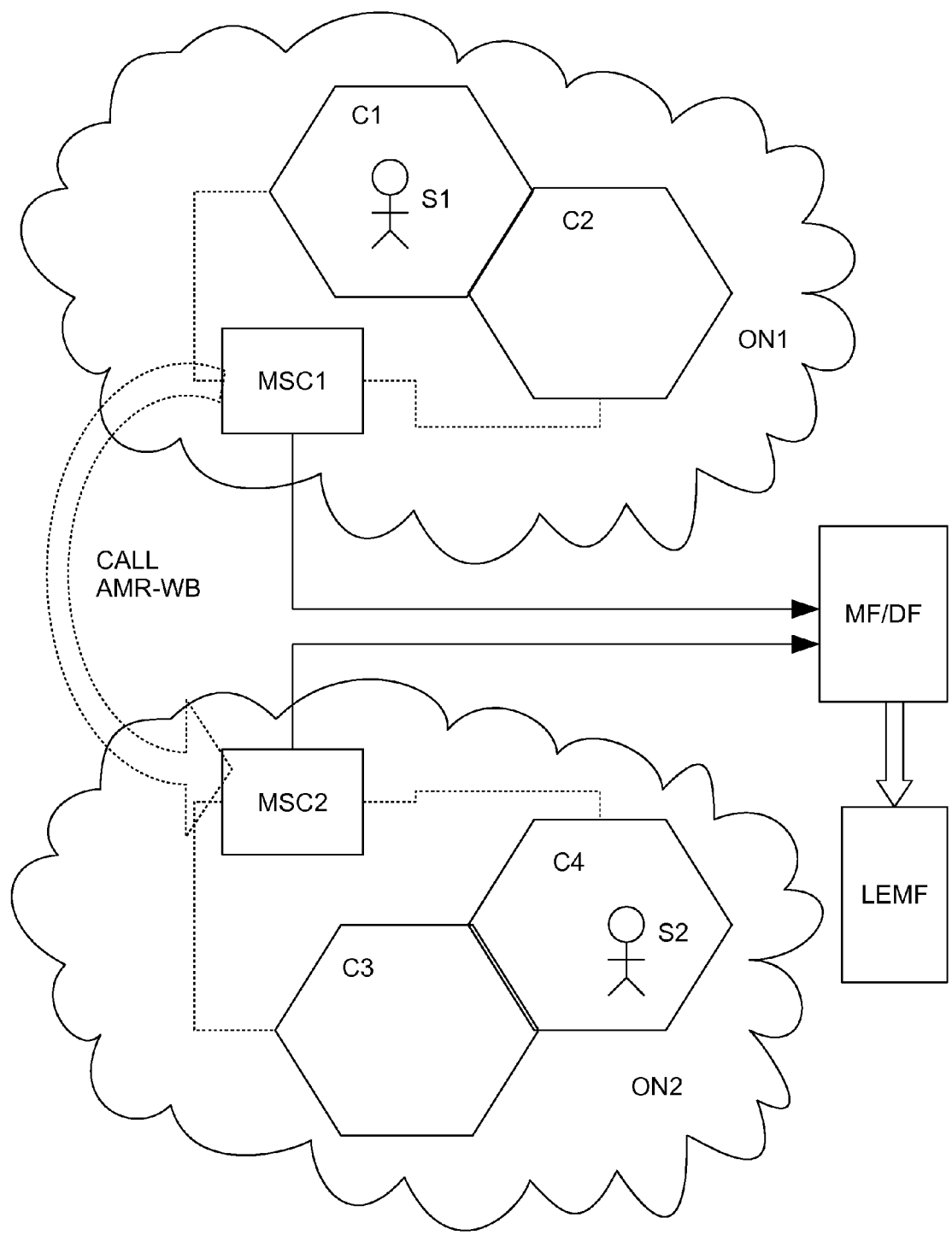
FIG. 3 is a block schematic illustration disclosing a telecommunication system.

FIG. 3 discloses schematically a telecommunication system. The system comprises in this example two Operator Networks ON1 and ON2. A first subject S1, i.e. a mobile phone identifier, can be seen in FIG. 3. The identity of this first subject S1 can be for example one of MSISDN, IMEI and IMSI codes commonly associated to a mobile phone subscription. A second subject S2 can also be seen in FIG. 3. The first Operator Network ON1 comprises two cell areas C1 and C2. A Mobile Switching Centre MSC1 controls the cell areas C1 and C2, and incorporates the functions of a first Intercepting Control Element ICE-1 as discussed in the preamble of this specification in connection with FIG. 1 of the prior art. The second Operator Network ON2 comprises two cell areas C3 and C4. A Mobile Switching Centre MSC2 controls the cell areas C3 and C4, and incorporated the functions of a second Intercepting Control Element ICE-2. The MSC1 and MSC2 are able to communicate with a MF/DF unit, which incorporates the Mediation Functions MF, MF2 and MF3 and Delivery Functions ADMF, DF2 and DF3 of the known Intercept Unit previously described with reference to FIG. 1.

In order to explain the invention, it is assumed that a call is about to occur between the first subject S1 who is going to call the second subject S2. The first subject S1 is therefore the calling subscriber, while the second subject S2 is the called subscriber.

Figure 4:
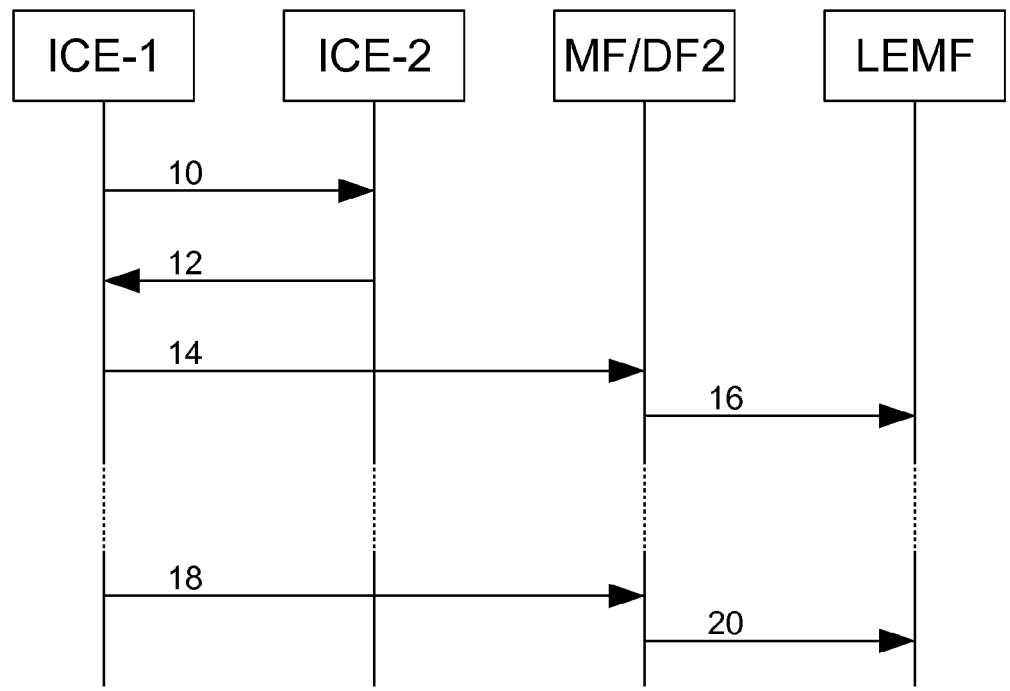
FIG. 4 discloses a signal sequence diagram representing exchanging of codec information in a Lawful interception environment when a calling subscriber is monitored.

In a first example of the invention, the first subject S1, i.e. the calling subscriber, is also a subject under interception. In this example, the sequence of signals which is of relevance for the invention is shown in the diagram of FIG. 4.

At call attempt initiation, for one 64 Kbit/s bidirectional target call, two ISDN delivery channels are established from the DF3 in the MF/DF unit to the LEMF. One channel offers the Content of Communication towards the target identity of subject S1 under interception, while the other channel offers the Content of Communication from the target identity of subject S1. This is the case of a stereo delivery. If the "call from" and "call to" a monitored subscriber are mixed and delivered using only one CC channel, then a mono delivery is effected.

When a call is initiated by calling subscriber S1 who calls the called subscriber S2, ICE-1 (which is implemented in originating MSC Server MSC1) sends to ICE-2 (which is implemented in destination MSC Server MSC2) a list of codecs 10 which possibly comprises, amongst codecs generically indicated as w, x, y, also AMR-WB codec as a negotiable one. Then, if destination MSC Server MSC2 considers that AMR-WB codec can be selected, according to the network capabilities, negotiation 12 of AMR-WB codec is returned from ICE-2 to ICE-1. A notification 14 is then sent by ICE-1 to MF/DF over interface X2 and an IRI-CONTINUE message 16 is in turn sent by MF2/DF2 of MF/DF to LEMF over HI2 interface to indicate that an end-to-end AMR-WB transparent path is established. This IRI-CONTINUE message preferably comprises a time stamp which gives the LEMF information on where to start to apply AMR-WB codec in the post-processing of the delivered call content, which is transferred to LEMF via the HI3 link.

Notification 14 from ICE-1 to MF/DF and consequent IRI-CONTINUE message 16 occur not only at call setup, but also when the AMR-WB codec is selected following a codec modification procedure, for example a mid-call codec negotiation and the like.

If calling subscriber S1 hangs up, an end notification 18 is sent by ICE-1 to MF/DF over X2 and an IRI-CONTINUE message 20 is sent by MF2/DF2 of MF/DF over HI2 interface to LEMF to indicate that the end-to-end transparent path is now terminated. End notification can also be sent by ICE-2 if called subscriber S2 hangs up. End notification is also received by MF/DF if a different codec other than AMR-WB codec is chosen as selected codec at codec modification, for example as an end notification sent by ICE-1, ICE-2 or even by another ICE if one or both parties had moved to another network or cell. The time stamp preferably comprised in the IRI-CONTINUE message will then give the LEMF information on where to stop applying AMR-WB codec in the post-processing of the delivered call content.

Time information which can be used in the post-processing of delivered call content can be provided in different form other than through a time stamp in the IRI-CONTINUE message, and for example they can be generated at the LEMF side on receiving the IRI-CONTINUE message.

Figure 5:
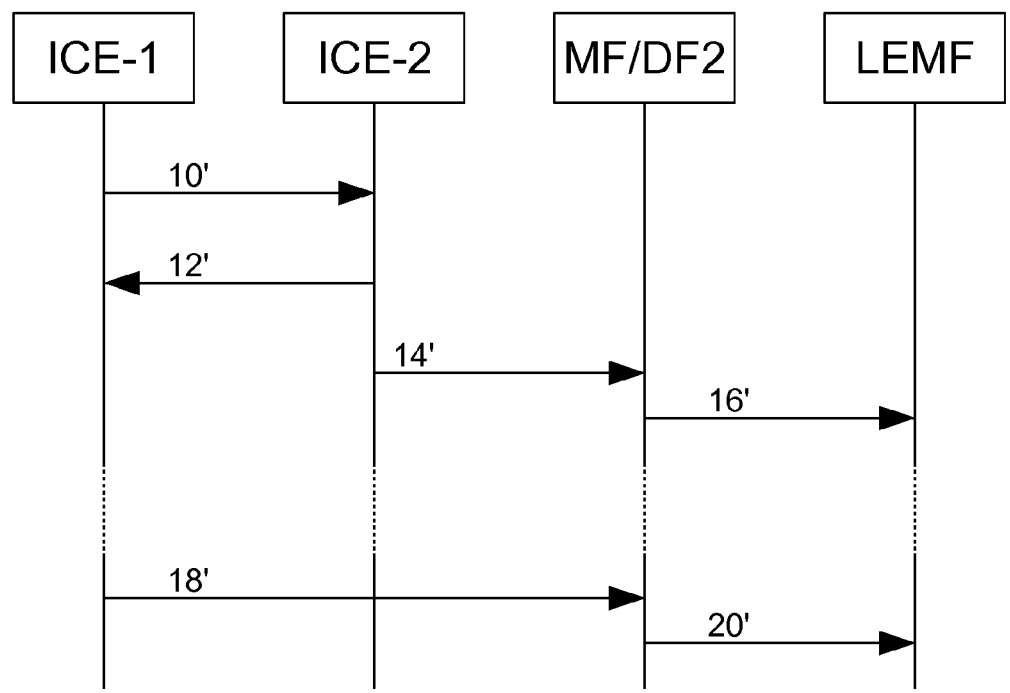
FIG. 5 discloses a signal sequence diagram representing exchanging of codec information in a Lawful interception environment when a called subscriber is monitored.

In a second example of the invention, the second subject S2, i.e. the called subscriber, is also a subject under interception. In this example, the sequence of signals which is of relevance for the invention is shown in the diagram of FIG. 5.

The sequence of operations and signals is quite similar to the one of the first example. When a call is initiated by calling subscriber S1 who calls the called monitored subscriber S2, ICE-1 sends to ICE-2 a list of codecs 10' as in the example of FIG. 4. Then, if destination MSC Server MSC2 considers that AMR-WB codec can be selected, according to the network capabilities, negotiation 12' of AMR-WB codec is returned from ICE-2 to ICE-1.

In this example, it is now ICE-2 which monitors the called subscriber S2 that sends a notification 14' to MF/DF over interface X2, so that an IRI-CONTINUE message 16' is in turn sent by MF2/DF2 of MF/DF to LEMF over HI2 interface, as in the previous example. Notification 14' from ICE-2 to MF/DF and consequent IRI-CONTINUE message 16' occur not only at call setup, but also when the AMR-WB codec is selected following a codec modification procedure, for example a mid-call codec negotiation and the like.

Likewise, when a different codec other than AMR-WB codec is chosen as selected codec at codec modification, an end notification is sent to MF/DF over X2 and an IRI-CONTINUE message 20' is sent by MF2/DF2 of MF/DF over HI2 interface to LEMF to indicate that the end-to-end transparent path is now terminated. In FIG. 5, it is shown by way of non limiting example that an end notification 18' is sent by ICE-1 to MF/DF to indicate that e.g. the calling party S1 has hanged up. The time stamp preferably comprised in the IRI-CONTINUE message will then give the LEMF information on where to stop applying AMR-WB codec in the post-processing of the delivered call content.

In the present invention, events which indicate that an end-to-end AMR-WB speech path is established or terminated are triggering information about end-to-end AMR-WB transparency sent from an ICE over X2 interface to DF2. The same events are also triggering DF2 to deliver IRI-CONTINUE messages containing information about end-to-end AMR-WB transparency to the LEMF over HI2 interface.

Therefore, the present invention advantageously complements the functions described for example in standard 3GPP TS 33.107 and 3GPP TS 33.108, release 8, concerning with events and records for provision of IRI on X2 interface, and event to generate Records for the delivery via HI2, respectively.

The new, complementing functions provided by the present invention in its preferred embodiment comprise some or all of the following:
- two new call-related events triggering information sent over X2 interface from ICE to DF2,
- a new information element/new event type for Circuit Event records over X2 interface,
- two new events triggering IRI-CONTINUE messages delivered to the LEMF,
- a new element, or a new value in an existing element, within IRI-Parameters over HI2 interface.

The present invention allows to correctly post-process the content of communication acquired trough the stereo or mono delivery modes described above, in cases where AMR-WB codec has been adopted during all or part of the intercepted end-to-end call. In particular, the LEMF can then apply a post-processing on the delivered call content with the appropriate codec to extract the complete baseband information in the needed time frame, i.e. between start and end of the AMR-WB end-to-end speech path, preferably marked by the time-stamp indicators.

A system that can be used to put the invention into practice is schematically shown with reference to FIGS. 1-5. Enumerated items are shown in the figure as individual elements. In actual implementations of the invention, however, they may be inseparable components of other electronic devices such as a digital computer. Thus, actions described above may be implemented in software that may be embodied in an article of manufacture that includes a program storage medium. The program storage medium includes data signal embodied in one or more of a carrier wave, a computer disk (magnetic, or optical (e.g., CD or DVD, or both), non-volatile memory, tape, a system memory, and a computer hard drive.

The systems and methods of the present invention may be implemented for example on any of the Third Generation Partnership Project (3GPP), European Telecommunications Standards Institute (ETSI), American National Standards Institute (ANSI) or other standard telecommunication network architecture. Other examples are the Institute of Electrical and Electronics Engineers (IEEE) or The Internet Engineering Task Force (IETF).

The description, for purposes of explanation and not limitation, sets forth specific details, such as particular components, electronic circuitry, techniques, etc., in order to provide an understanding of the present invention. But it will be apparent to one skilled in the art that the present invention may be practiced in other embodiments that depart from these specific details. In other instances, detailed descriptions of well-known methods, devices, and techniques, etc., are omitted so as not to obscure the description with unnecessary detail. Individual function blocks are shown in one or more figures. Those skilled in the art will appreciate that functions may be implemented using discrete components or multi-function hardware. Processing functions may be implemented using a programmed microprocessor or general-purpose computer. The invention is not limited to the above described and in the drawings shown embodiments but can be modified within the scope of the enclosed claims.

The invention claimed is:

1. A method to detect an end-to-end call on an Adaptive Multi-Rate Wideband (AMR-WB) capable network involving at least one identity being monitored by a Law Enforcement Monitoring Facility (LMEF), the method comprising the following steps:
    monitoring call events related to the at least one identity monitored by the LMEF through at least one intercepting control element in a telecommunication network,
    delivering a start notification message by the at least one intercepting control element to the LMEF whenever an AMR-WB codec is chosen in the telecommunication network as a selected codec for an end-to-end call between the at least one monitored identity and another identity; and
    delivering an end notification message by the at least one intercepting control element to the LMEF whenever the adoption of the AMR-WB codec in the telecommunication network as the selected codec for the end-to-end call is terminated,
    wherein an AMR-WB decoder is applied to a call acquired at a monitoring facility within a time frame comprised between a starting time indicated by a time-stamp indicator associated to the start notification message and an ending time indicated by the time-stamp indicator associated to a subsequent end notification message.

2. The method to detect an end-to-end call according to claim 1, wherein the end notification message is delivered by the at least one intercepting control element to the LMEF whenever a codec other than an AMR-WB codec is chosen in the telecommunication network.

3. The method to detect an end-to-end call according to claim 1, wherein the end notification message is delivered by the at least one intercepting control element to the LMEF when the call using an AMR-WB codec is terminated.

4. The method to detect an end-to-end call according to claim 1, further comprising the step of associating the time-stamp indicator to each notification message.

5. The method to detect an end-to-end call according to claim 1, further comprising the step of acquiring at the monitoring facility codified content of the call involving the at least one identity monitored by the LMEF, each notification message being delivered to the monitoring facility.

6. A node to detect an end-to-end call on an Adaptive Multi-Rate Wideband (AMR-WB) capable network involving at least one identity monitored by a Law Enforcement Monitoring Facility (LMEF), the node comprising:
    an intercepting control unit to monitor call events related to the at least one identity monitored by the LMEF; and
    a delivering element in the intercepting control unit, which delivers a start notification message to the LMEF whenever an AMR-WB codec is chosen in the telecommunication network as a selected codec for an end-to-end call between the at least one identity monitored by the LMEF and another identity,
    wherein the delivering element in the intercepting control unit further delivers a stop notification message to the LMEF whenever a codec other than the AMR-WB codec is chosen in the telecommunication network, or when the end-to-end call using the AMR-WB codec is terminated, and
    wherein an AMR-WB decoder is applied to a call acquired at a monitoring facility within a time frame comprised between a starting time indicated by a time-stamp indicator associated to the start notification message and an ending time indicated by the time-stamp indicator associated to a subsequent end notification message.

7. The node according to claim 6, comprising a time-stamping element which associates the time-stamp indicator to each notification message delivered by the delivering element.

8. A mobile switching center (MSC) comprising an intercepting control element (ICE) for detecting an end-to-end call on an Adaptive Multi-Rate Wideband (AMR-WB) capable network involving at least one identity monitored by a Law Enforcement Monitoring Facility (LMEF), the ICE comprising:
    monitoring means to monitor call events related to the at least one identity monitored by the LMEF in a telecommunication network,
    delivering means to deliver a start notification message to the LMEF whenever an AMR-WB codec is chosen in the telecommunication network as a selected codec for an end-to-end call between the at least one identity monitored by the LMEF and another identity,
    wherein the delivering means further delivers an end notification message by the at least one intercepting control element to the LMEF whenever a codec other than the AMR-WB codec is chosen in the telecommunication network or when the end-to-end call using the AMR-WB codec is terminated, and
    wherein an AMR-WB decoder is applied to a call acquired at a monitoring facility within a time frame comprised between a starting time indicated by a time-stamp indicator associated to the start notification message and an ending time indicated by the time-stamp indicator associated to a subsequent end notification message.

9. The MSC according to claim 8, further comprising means to associate the time-stamp indicator to each notification message.

10. The MSC according to claim 8, wherein the MSC is part of a Lawful Interception and/or Data Retention configuration.

11. An article of manufacture comprising a non-transitory program storage memory having computer readable program code embodied therein to detect an end-to-end call on an Adaptive Multi-Rate Wideband (AMR-WB) capable network involving at least one identity monitored by a Law Enforcement Monitoring Facility (LMEF), the program code comprising:
    computer readable program code able to monitor call events related to the at least one identity monitored by the LMEF in a telecommunication network; and
    computer readable program code able to deliver a start notification message to the LMEF whenever an AMR-WB codec is chosen in the telecommunication network as a selected codec for an end-to-end call between the at least one identity monitored by the LMEF and another identity,
    wherein the program code also comprises computer readable program code able to deliver an end notification message by the at least one intercepting control element to the LMEF whenever a codec other than the AMR-WB codec is chosen in the telecommunication network or when the end-to-end call using the AMR-WB codec is terminated; and wherein an AMR-WB decoder is applied to a call acquired at a monitoring facility within a time frame comprised between a starting time indicated by a time-stamp indicator associated to the start notification message and an ending time indicated by the time-stamp indicator associated to a subsequent end notification message.

12. The article of manufacture according to claim 11, wherein the program code further comprises computer readable program able to associate the time-stamp indicator to each notification message.

* * * * *